(12) United States Patent
Gharghi et al.

(10) Patent No.: US 10,019,090 B2
(45) Date of Patent: Jul. 10, 2018

(54) DISPLAY WITH TOUCH SENSOR CIRCUITRY

(71) Applicant: Apple Inc., Cupertino, CA (US)

(72) Inventors: Majid Gharghi, Mountain View, CA (US); Sungki Lee, Sunnyvale, CA (US); Abbas Jamshidi Roudbari, Sunnyvale, CA (US); Shin-Hung Yeh, Taipei (TW); Ting-Kuo Chang, Cupertino, CA (US); Yu Cheng Chen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 193 days.

(21) Appl. No.: 15/238,355

(22) Filed: Aug. 16, 2016

(65) Prior Publication Data

US 2017/0269744 A1 Sep. 21, 2017

Related U.S. Application Data

(60) Provisional application No. 62/310,200, filed on Mar. 18, 2016.

(51) Int. Cl.
| | |
|---|---|
| *G06F 3/041* | (2006.01) |
| *G06F 3/044* | (2006.01) |
| *G09G 3/36* | (2006.01) |
| *G02F 1/1333* | (2006.01) |
| *G02F 1/1362* | (2006.01) |
| *G02F 1/1343* | (2006.01) |
| *G02F 1/1368* | (2006.01) |

(52) U.S. Cl.
CPC .......... *G06F 3/0412* (2013.01); *G02F 1/1368* (2013.01); *G02F 1/13338* (2013.01); *G02F 1/13439* (2013.01); *G02F 1/136286* (2013.01); *G06F 3/044* (2013.01); *G09G 3/3677* (2013.01)

(58) Field of Classification Search
CPC ......... G06F 3/0412; G06F 3/044; G06F 1/169
See application file for complete search history.

(56) References Cited

U.S. PATENT DOCUMENTS

| 6,204,897 B1 | 3/2001 | Colgan et al. |
| 8,947,370 B2 * | 2/2015 | An ........................ G06F 3/044 |
| | | 178/18.01 |
| 9,013,419 B2 | 4/2015 | Wu et al. |

(Continued)

FOREIGN PATENT DOCUMENTS

WO   WO-2013185534 A1 * 12/2013   ........... G06F 3/0416

*Primary Examiner* — Kent W Chang
*Assistant Examiner* — Nathaniel P Brittingham
(74) *Attorney, Agent, or Firm* — Treyz Law Group, P.C.; George Victor Treyz; Jason Tsai

(57) ABSTRACT

A display may have an array of pixels. A transparent conductive layer may serve as a common voltage electrode layer and may distribute a common voltage to each of the pixels. Metal layers may be used to form routing structures. One of the metal layers may be patterned to form gate lines that distribute control signals to thin-film transistors in the pixels. Touch sensor circuitry may be coupled to horizontal and vertical capacitive touch sensor electrodes formed from the transparent conductive layer. A touch sensor signal border routing path in an inactive area of the display may have openings that run parallel to the gate lines and that each overlap one of the gate lines to reduce capacitive coupling between the gate lines and the touch sensor signal border routing path.

19 Claims, 6 Drawing Sheets

(56) References Cited

U.S. PATENT DOCUMENTS

| | | |
|---|---|---|
| 9,122,362 B2 | 9/2015 | Park et al. |
| 2007/0074914 A1* | 4/2007 | Geaghan ................ G06F 3/044 178/18.06 |
| 2012/0062510 A1* | 3/2012 | Mo ........................ G06F 3/044 345/174 |
| 2012/0274602 A1 | 11/2012 | Bita et al. |
| 2013/0050108 A1* | 2/2013 | Hong .................... G06F 3/0416 345/173 |
| 2013/0181940 A1* | 7/2013 | Lai ........................ G06F 3/044 345/174 |
| 2013/0265247 A1* | 10/2013 | Yang ...................... G06F 3/041 345/173 |
| 2016/0131938 A1 | 5/2016 | Ji et al. |
| 2017/0003786 A1* | 1/2017 | Kim .................. G02F 1/136286 |
| 2017/0269744 A1* | 9/2017 | Gharghi ................ G06F 3/0412 |

* cited by examiner

DISPLAY WITH TOUCH SENSOR CIRCUITRY

This application claims the benefit of provisional patent application No. 62/310,200, filed Mar. 18, 2016, which is hereby incorporated by reference herein in its entirety.

BACKGROUND

This relates generally to displays, and, more particularly, to displays with touch sensors.

Electronic devices such as cellular telephones, computers, and wristwatch devices often include displays. Displays sometimes include touch sensing functionality. Touch sensitive displays can gather touch input from a user such as touch gestures.

It can be challenging to incorporate touch sensors into displays. If care is not taken, touch sensor or display functionality will be compromised.

SUMMARY

A display may have an array of pixels. The display may be a liquid crystal display or may be a display of other types.

In a liquid crystal display, the array of pixels may have electrodes that supply electric fields to a liquid crystal layer. The electrodes may be formed from transparent conductive materials such as indium tin oxide. A first indium tin oxide layer may serve as a common voltage electrode layer and may distribute a common voltage to each of the pixels. A second indium tin oxide layer may form electrode fingers. Liquid crystal material may be interposed between the electrode fingers of each pixel and the common voltage electrode.

Metal layers may be used to form signal routing structures. One of the metal layers may be patterned to form gate lines that distribute control signals to thin-film transistors in the pixels. Metal layers may also be used in forming source-drain terminals for the thin-film transistors and other conductive structures.

The display may have an active area in which the array of pixels displays images and may have inactive border areas that are free of pixels and that do not display images. Touch sensor circuitry may be coupled to horizontal and vertical capacitive touch sensor electrodes formed in the active area from the first indium tin oxide layer. A touch sensor signal border routing path in the inactive area may have openings that run parallel to the gate lines and that each overlap one of the gate lines to reduce capacitive coupling between the gate lines and the touch sensor signal border routing path.

DETAILED DESCRIPTION

Figure 1:
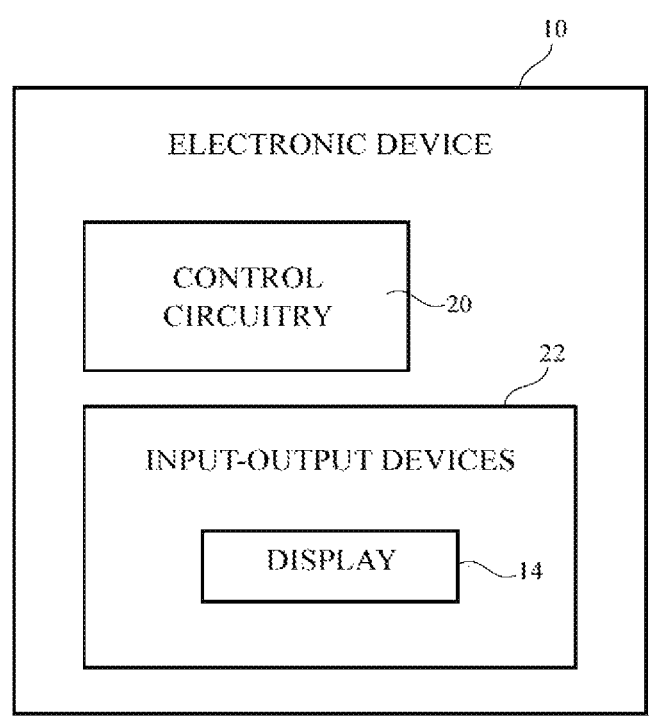
FIG. 1 is a schematic diagram of an illustrative electronic device having a display in accordance with an embodiment.

Electronic devices may be provided with displays such as touch-sensitive displays. A schematic diagram of an illustrative electronic device with a touch-sensitive display is shown in FIG. 1. Device 10 of FIG. 1 may be a computing device such as a laptop computer, a computer monitor containing an embedded computer, a tablet computer, a cellular telephone, a media player, or other handheld or portable electronic device, a smaller device such as a wristwatch device (e.g., a watch with a wrist strap), a pendant device, a headphone or earpiece device, a device embedded in eyeglasses or other equipment worn on a user's head, or other wearable or miniature device, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, electronic device 10 may have control circuitry 20. Control circuitry 20 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 20 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 22 may be used to allow data to be supplied to device 10 and to allow data to be provided from device 10 to external devices. Input-output devices 22 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 22 and may receive status information and other output from device 10 using the output resources of input-output devices 22.

Input-output devices 12 may include one or more displays such as display 14. Display 14 may be a touch screen display that includes a touch sensor for gathering touch input from a user. The touch sensor for display 14 may be based on an array of capacitive touch sensor electrodes. The electrodes may be formed from patterned portions of a conductive display layer (e.g., a common voltage electrode layer sometimes referred to as a Vcom layer). This allows both touch sensor structures and display structures to be integrated into a common display (sometimes referred to as an in-cell touch display).

Control circuitry 20 may be used to run software on device 10 such as operating system code and applications. During operation of device 10, the software running on control circuitry 20 may display images on display 14.

Display 14 may be a liquid crystal display, an organic light-emitting diode display, an electrophoretic display, an electrowetting display, a display formed from an array of discrete light-emitting diodes formed from crystalline semiconductor die, or any other suitable type of display. Configurations in which display 14 is a liquid crystal display may sometimes be described herein as an example. This is, however, merely illustrative. Any suitable type of display may be used for device 10, if desired.

Figure 2:
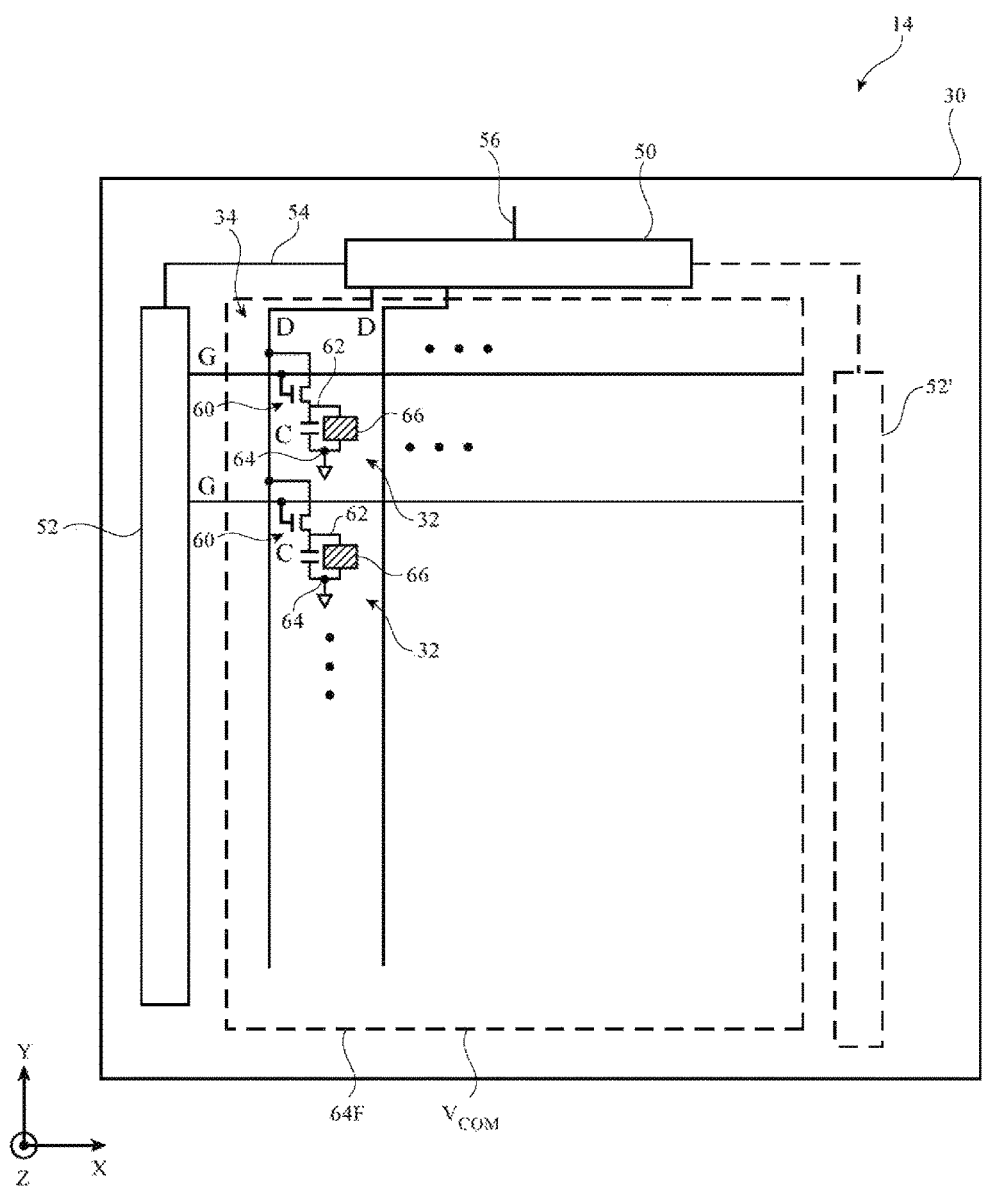
FIG. 2 is a top view of an illustrative array of pixels and associated display driver circuitry for a display in accordance with an embodiment.

FIG. 2 is a diagram of an illustrative display. As shown in FIG. 2, display 14 may include layers such as substrate layer 30. Substrate layers such as layer 30 may be formed from planar rectangular layers of material or layers of material with other shapes (e.g., shapes with one or more curved and/or straight edges). The substrate layers of display 14 may include glass layers, polymer layers, composite films that include polymer and inorganic materials, etc. There may be upper and lower substrate layers in display 14 and display 14 may include a layer of liquid crystal material sandwiched between the upper and lower substrate layers. The substrates may be used to support thin-film transistor circuitry and color filter elements.

Display 14 may have an array of pixels 32 for displaying images for a user such as pixel array 34. Pixels 32 in array 34 may be arranged in rows and columns. The edges of array 34 may be straight as shown in FIG. 2 and/or may have curved portions. There may be any suitable number of rows and columns in array 34 (e.g., ten or more, one hundred or more, or one thousand or more, etc.). Display 14 may include pixels 32 of different colors. As an example, display 14 may include red pixels, green pixels, and blue pixels. If desired, a backlight unit may provide backlight illumination for display 14.

Display driver circuitry may be used to control the operation of pixels 34. The display driver circuitry may be formed from integrated circuits, thin-film transistor circuits, or other suitable circuitry. The display driver circuitry of FIG. 2 includes display driver circuitry 50 and additional display driver circuitry such as gate driver circuitry 52. Gate driver circuitry 52 may be formed along one or more edges of display 14 (see, e.g., illustrative gate driver circuitry 52' on the right edge of display 14).

As shown in FIG. 2, display driver circuitry 50 (e.g., one or more display driver integrated circuits, thin-film transistor circuitry, etc.) may contain communications circuitry for communicating with system control circuitry over signal path 56. Path 56 may be formed from traces on a flexible printed circuit or other cable. The control circuitry may be located on one or more printed circuits in electronic device 10. During operation, the control circuitry (e.g., control circuitry 20 of FIG. 1) may supply circuitry such as a display driver integrated circuit in circuitry 50 with image data for images to be displayed on display 14. Display driver circuitry 50 of FIG. 2 is located at the top of display 14. This is merely illustrative. Display driver circuitry 50 may be located at both the top and bottom of display 14, on the bottom of display 14, or in other portions of device 10.

To display the images on pixels 32, display driver circuitry 50 may supply corresponding image data to data lines D while issuing control signals to supporting display driver circuitry such as gate driver circuitry 52 over signal paths 54. With the illustrative arrangement of FIG. 2, data lines D run vertically through display 14 and are associated with respective columns of pixels 32.

Gate driver circuitry 52 (sometimes referred to as gate line driver circuitry or horizontal control signal circuitry) may be implemented using one or more integrated circuits and/or may be implemented using thin-film transistor circuitry on substrate 30. Horizontal control lines G (sometimes referred to as gate lines, scan lines, emission control lines, etc.) run horizontally through display 14. Each gate line G may be associated with a respective row of pixels 32. If desired, there may be multiple horizontal control lines such as gate lines G associated with each row of pixels. The configuration of FIG. 2 in which each gate line G is associated with a respective row of pixels 32 is merely illustrative.

Gate driver circuitry 52 may assert control signals on the gate lines G in display 14. For example, gate driver circuitry 52 may receive clock signals and other control signals from circuitry 50 and may, in response to the received signals, assert a gate line signal on gate lines G in sequence, starting with the gate line signal G in the first row of pixels 32 in array 34. As each gate line is asserted, data from data lines D may be loaded into a corresponding row of pixels. In this way, control circuitry such as display driver circuitry 50 and 52 may provide pixels 32 with signals that direct pixels 32 to display a desired image on display 14.

As shown in the illustrative configuration of FIG. 2, each pixel 32 may have a thin-film transistor 60. Thin-film transistor 60 may have source-drain terminals that are coupled between date line D and node 62. Storage capacitor C may be coupled between node 62 and common voltage (Vcom) electrode (node) 64 in parallel with liquid crystal material 66 (a portion of a liquid crystal layer in display 14 that is associated with pixel 32). Material 66 is therefore sandwiched between a first electrode at node 64 (part of common voltage electrode Vcom) formed from a first transparent conductive layer and a second electrode (electrode fingers) formed from a second transparent conductive layer coupled to node 62.

Pixel 32 may be loaded with a desired data value from data line D by asserting a gate signal on gate line G. This gate line signal is applied to the gate of transistor 60 and turns on transistor 60 so that the voltage on data line D (i.e., the data for pixel 32) is loaded onto storage capacitor C and node 62. The electrode fingers for pixel 32 that are coupled to node 62 apply an electric field through liquid crystal material 66 that terminates on the Vcom electrode at node 64, thereby controlling light transmission through pixel 32. Storage capacitor C retains the loaded data value and therefore maintains a desired electric field across liquid crystal material 66 between frames of image data.

A blanket conductive film (e.g., a transparent film formed from a transparent conductive material such as indium tin oxide) may be used in forming the Vcom (common voltage) electrode (see, e.g., Vcom film 64F). A transparent conductive layer may also be patterned to form the electrode fingers for each pixel.

To form a touch sensor in display 14, Vcom film 64F may be patterned (segmented) to form horizontal and vertical touch sensor electrodes (i.e., capacitive touch sensor electrodes), while still allowing the Vcom film to serve as a common voltage electrode for pixels 32. The vertical electrodes may sometimes be referred to as column common voltage electrodes (CVcom) and may be formed from unbroken thin strips of film 64F. The horizontal electrodes may sometimes be referred to as row common voltage electrodes (RVcom) and may be formed from rectangular sections of Vcom film 64F that are interconnected using horizontal interconnect paths (sometimes referred to as shorting lines) that bridge the vertical electrodes. Other configurations may also be used for the horizontally extending and vertically extending capacitive touch sensor electrodes, if desired.

Display 14 may have a color filter layer formed from an array of color filter elements on a first transparent substrate such as a clear glass substrate and may have a thin-film transistor layer formed from a layer of thin-film transistor circuitry on a second transparent substrate such as a transparent glass substrate. Configurations in which display 14 has both thin-film transistor circuitry and color filter element structures on a common substrate may also be used. A layer of liquid crystal material (see, e.g., liquid crystal material 66 of FIG. 2) may be interposed between the first and second substrates.

Figure 3:
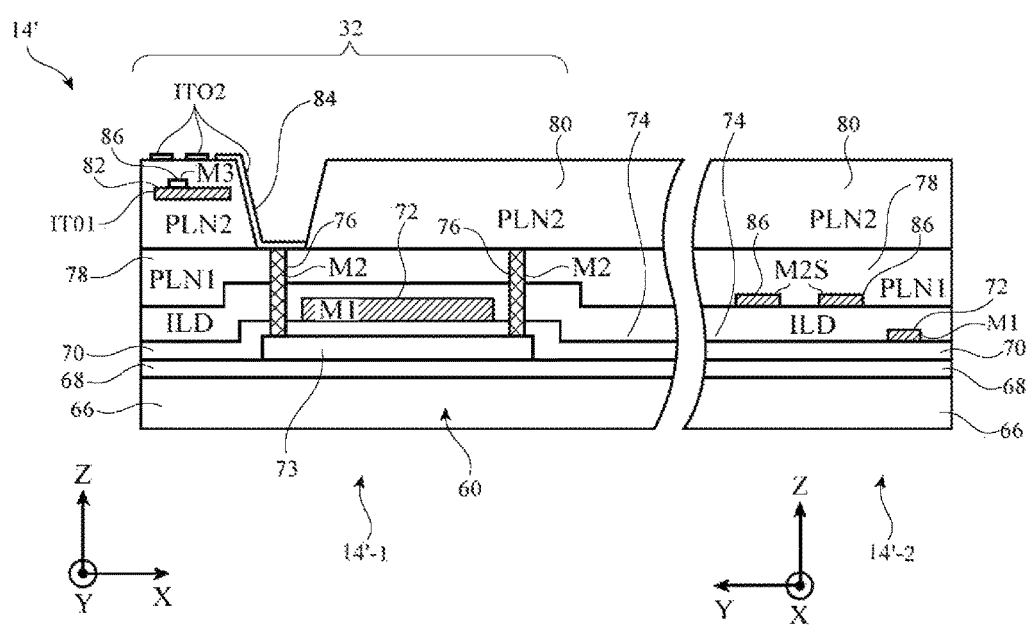
FIG. 3 is a cross-sectional side view of illustrative thin-film structures that may be used in forming a display in accordance with an embodiment.

Any suitable thin-film transistor circuitry may be used in forming capacitors, pixel electrodes, thin-film transistors, and other circuitry for pixels 32. A cross-sectional side view of an illustrative thin-film transistor layer is shown in FIG. 3. In the example of FIG. 3, thin-film transistor layer 14' includes a first portion 14'-1 (a portion of layer 14' in the active area of display 14 that is being viewed along dimension Y of FIG. 2) and a second portion 14'-2 (a portion of layer 14' in the active area of display 14 taken along dimension X of FIG. 2).

As shown in FIG. 3, thin-film transistor layer 14' may have a transparent substrate such a glass substrate (substrate 66). During operation, backlight illumination may pass through substrate 66 to illuminate pixels 32 for a viewer. Color filter elements such as red, green, and blue color filter elements that are aligned with pixels 32 may be used to provide display 14 with the ability to display color images.

One or more buffer layers of inorganic dielectric material such as buffer layer 68 may be formed on substrate 66. Semiconductor layer 73 may be used to form the active region of transistor 60. Semiconductor layer 73 may be formed from silicon (e.g., polysilicon), from a semiconducting oxide (e.g., indium gallium zinc oxide), or other suitable semiconductor. Gate insulator layer 70 may be formed from an inorganic dielectric such as silicon oxide. The gate of transistor 60 may be formed from gate metal 72 (sometimes referred to as metal layer M1). Metal layer M1 may also be used in forming conductive paths in display 14 (see, e.g., metal line 72 in region 14'-2, which forms a gate line display 14).

A dielectric layer such as interlayer dielectric layer (ILD) 74 may cover metal layer Ml. the ILD layer may be formed from one or more inorganic dielectrics (e.g., silicon oxide, silicon nitride, etc.). Organic dielectric layers such as planarization layers 78 (sometimes referred to as planarization layer PLN1) and 80 (sometimes referred to as planarization layer PLN2) may cover interlayer dielectric layer. Metal layer 76 (sometimes referred to as metal layer M2 or a source-drain metal layer) may be used in forming source-drain terminals for transistor 60. Metal layer 86 (sometimes referred to as metal layer M2S) may be used in forming conductive structures for display 14 such as signal lines.

One or more transparent conductive layers may be included in display 14. For example, Vcom film 64F of FIG. 2 may be formed from a first transparent conductive layer 82 and electrode fingers for pixel 32 (and a via that couples the electrode fingers to one of the source-drain terminals of transistor 60) may be formed from a second transparent layer 84. Layers 82 and 84, which may sometimes be respectively referred to as ITO1 and ITO2, may be formed from transparent conductive material such as indium tin oxide, thin metal layers, etc.

Layer ITO1 may be used in forming Vcom film 64F (FIG. 2) and other structures in display 14. Metal layer 86 (sometimes referred to as metal layer M3) may be formed on portions of layer ITO1 (e.g., in a mesh pattern, as a blanket film, or in other suitable patterns) to reduce the sheet resistance of portions of layer ITO1.

The illustrative configuration of FIG. 3 uses six conductive layers (four metal layers M1, M2, M2S, and M3 and two indium tin oxide layers ITO1 and ITO2), but other arrangements with fewer conductive layers or more conductive layers may be used for display 14, if desired. The thin-film circuitry on substrate 66 of thin-film transistor layer 14' of FIG. 3 is merely illustrative.

Figure 4:
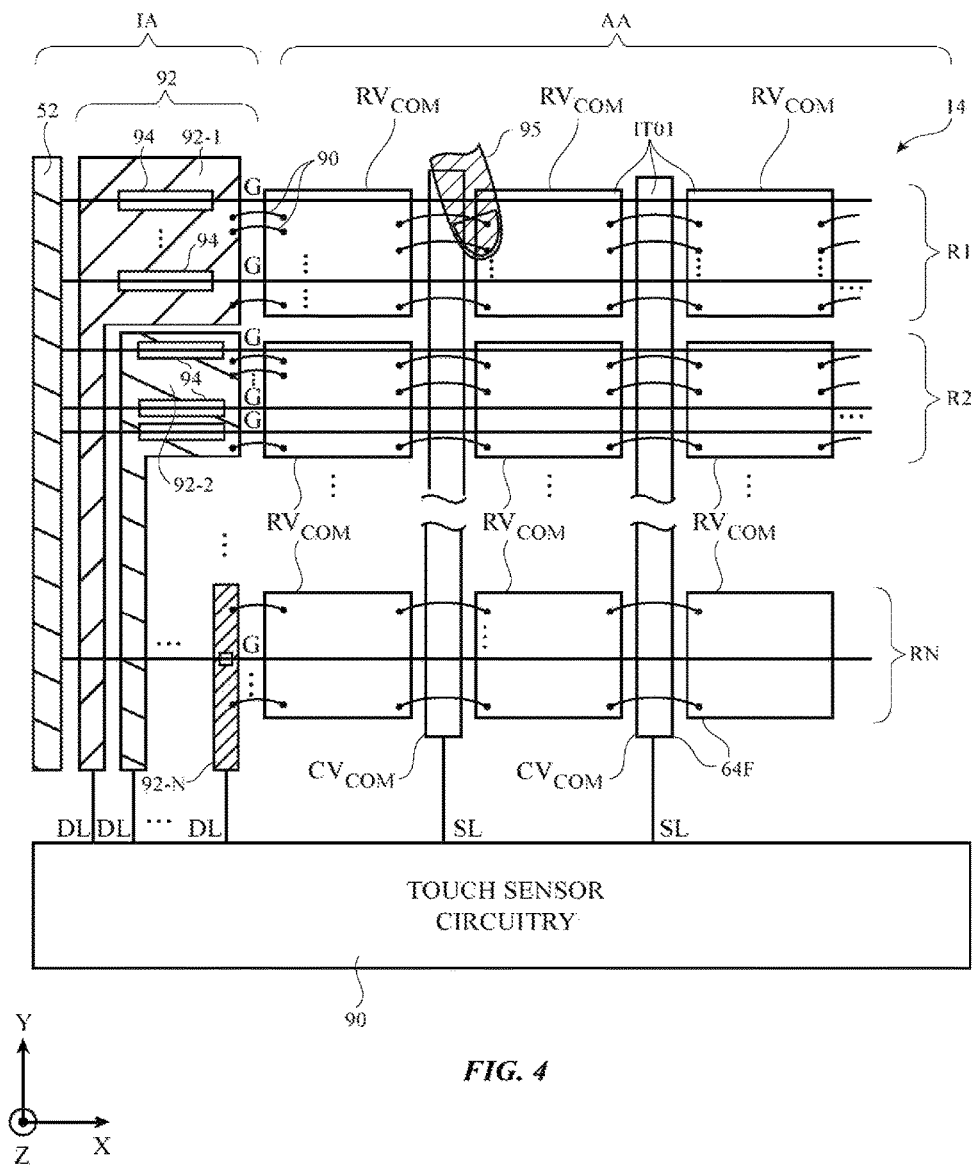
FIG. 4 is a diagram of illustrative touch sensor electrodes and associated touch sensor circuitry for a display in accordance with an embodiment.

FIG. 4 is a top view of display 14 showing touch sensor structures formed by patterning Vcom film 64F from layer ITO1. As shown in FIG. 4, touch sensor electrodes RVcom may extend horizontally along dimension X. Each horizontal touch sensor electrode RVcom may be formed from a row of rectangular patches formed from portions of layer ITO1 (i.e., portions of film 64F) shorted together by shorting lines 90. Shorting lines 90 may be formed from metal layer M1 or other conductive structures. Touch sensor electrodes CVcom may extend in vertical strips running along dimension Y and may be bridged by shorting lines 90 (i.e., lines 90 and other portions of the horizontal electrodes are not electrically shorted to vertical electrodes CVcom).

Display 14 may have an active area AA that contains pixel array 34 for displaying images for a user and one or more border regions such as inactive areas IA that run along the edges of active area AA. In active area AA, the transparent RVcom and CVcom electrodes can overlap pixels 32 and can carry a common voltage (Vcom) to nodes 64 in pixels 32. Inactive area IA of display 14 may be free of pixels 32 and may contain supporting circuitry for display 14 such as display driver circuitry 52 for driving gate line signals onto respective horizontally extending gate lines G. Touch sensor control circuitry such as touch sensor circuitry 90 may be formed from one or more integrated circuits and/or thin-film transistor circuitry and can be mounted in an inactive area in display 14 or on a separate printed circuit.

Borders in display 14 such as borders on the left and right edges of display 14 (sometimes called horizontal-dimension borders or X-borders) may contain conductive signal paths for routing touch sensor signals to horizontal touch sensor electrodes RVcom. For example, touch sensor signal border routing paths 92 may be formed in an inactive area IA running along the left border of display 14 of FIG. 4 (and, if desired, on the right border of display 14).

Border routing paths 92 may include multiple parallel paths each of which distributes a respective touch sensor drive signal DL from touch sensor circuitry 90 to a corresponding horizontal touch sensor electrode RVcom in a respective touch sensor electrode row. Touch sensor circuitry 90 may monitor corresponding sense signals SL on vertical electrodes CVcom. When a user's finger such as finger 95 is present at the intersection of a given row and given column, capacitive coupling through the finger will cause a drive signal from the horizontal electrode associated with the given row to be received on the vertical electrode associated with the given column. Touch sensor circuitry 90 may process the drive and sense signals to determine the location (in lateral dimensions X and Y) at which finger 95 is present on display 14.

Border routing paths 92 may have a first path 92-1 that routes drive signals from touch sensor circuitry 90 to horizontal touch sensor electrode RVcom in a first row of the touch sensor electrodes (i.e., row R1), a second path 92-2 that routes drive signals to electrode RVcom in second row R2, . . . and an $N^{th}$ path 92-N that routes drive signals to electrode RVcom in $N^{th}$ row RN. The RVcom and CVcom electrodes may be formed from layer ITO1 or other conductive layer(s) in thin-film circuitry 14' of FIG. 3, shorting paths 90 may be formed from metal layer M1 and/or other conductive layer(s) in thin-film circuitry 14' of FIG. 3, and gate lines G may be formed from metal layer M1 and/or other conductive layer(s) in thin-film circuitry 14' of FIG. 3. Each horizontal touch sensor electrode RVcom in display 14 may overlap numerous gate lines G, as shown in FIG. 4.

Border routing paths 92 (i.e., paths 92-1 . . . 92-N) may each be formed from one or more of the conductive layers in the thin-film circuitry of thin-film transistor layer 14' (FIG. 3). The use of multiple conductive layers in routing paths 92 (e.g., layers that are shorted to each other by placing these layers in direct contact with each other and/or layers that are shorted to each other by using conductive vias that pass through intervening dielectric) helps reduce the resistances of paths 92 and thereby enhances touch sensor performance.

Paths 92 extend along vertical dimension Y and gate lines G extend perpendicularly along horizontal dimension X. As a result, gate lines G cross over paths 92 as gate lines G extend from gate line driver circuitry 52 to the pixels in active area AA of display 14. Due to the overlap between horizontally extending gate lines G and vertically extending border routing paths 92 in inactive border area IA, there is a potential for capacitive coupling between gate lines G and border routing paths 92. Excessive capacitive coupling between paths 92 and gate lines G can allow drive line signals DL to leak into gate lines G. These drive line signals DL may then leak out of gate lines G into vertical electrodes CVcom and contribute noise that competes with the touch sensor signals that are coupled through finger 95. Excessive capacitive coupling between paths 92 and gate lines G can therefore reduce signal-to-noise ratios in sensed signals SL and adversely affect touch sensor performance.

To reduce capacitive coupling between gate lines G and border routing paths 92, border routing paths 92 may be provided with openings 94 that overlap gate lines G. Openings 94 may have elongated shapes such as slot shapes or gaps that extend horizontally along gate lines G. Some or all of the conductive layers that form routing paths 92 are removed in openings 94, so that the overlap between gate lines G and the conductive layer(s) of paths 92 is reduced, thereby reducing capacitive coupling between gate lines G and paths 92.

With one illustrative configuration, paths 92 are each formed using overlapping strips of conductive material from metal layers M1, M2S M2, and M3 and from ITO layers ITO1 and ITO2. Openings 94 may be formed in one or more, two or more, three or more, or four or more of these layers. As an example, openings 94 may be formed in at least the conductive layer that is most likely to contribute to capacitive coupling between gate lines G and paths 92 (i.e., openings 94 may at least be formed in metal layer M2S, which is the layer that is closest to the metal layer M1 that is used in forming gate lines G).

Figure 5:
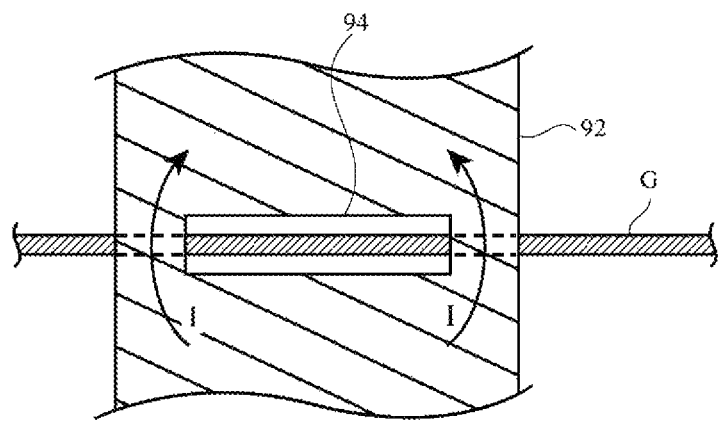
FIG. 5 is a diagram of an illustrative metal layer in a touch sensor border routing path with a slot-shaped opening that overlaps a gate line for reducing capacitive coupling between the touch sensor border routing path and the gate line in accordance with an embodiment.
Figure 6:
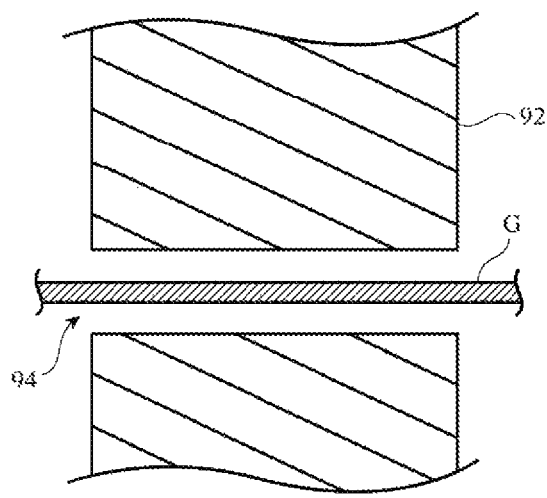
FIG. 6 is a diagram of an illustrative touch sensor border routing trace with a gap-shaped opening that overlaps a gate line for reducing capacitive coupling between the border routing trace and the gate line in accordance with an embodiment.

Openings 94 may be slot-shaped, as shown in FIG. 5. Slot-shaped opening 94 of FIG. 5 has two closed ends (end portions where conductive material is present). If desired, slot-shaped openings may be formed that have one closed end and one open end. During operation, drive signals (represented by current I of FIG. 5) may pass through the conductive material at the ends of slot-shaped opening 94. Current may also pass through layers of material above and below the layer in which opening 94 is formed. This allows openings 94 to be formed that have the shape of gaps that divide paths 92 into multiple parts, as shown in FIG. 6.

In general, any suitable opening(s) may be formed in one or more of the layers of conductive material forming paths 92 to help reduce capacitive coupling between gate lines G and paths 92. For example, each opening 94 may cover the entire segment of gate line G that crosses path 92 (as shown in FIG. 6), may cover part of the segment of gate line G that crosses path 92 (as shown in FIG. 5), may have multiple dots or other openings that run along a segment of gate line G that is crossing path 92, etc.

Figure 7:
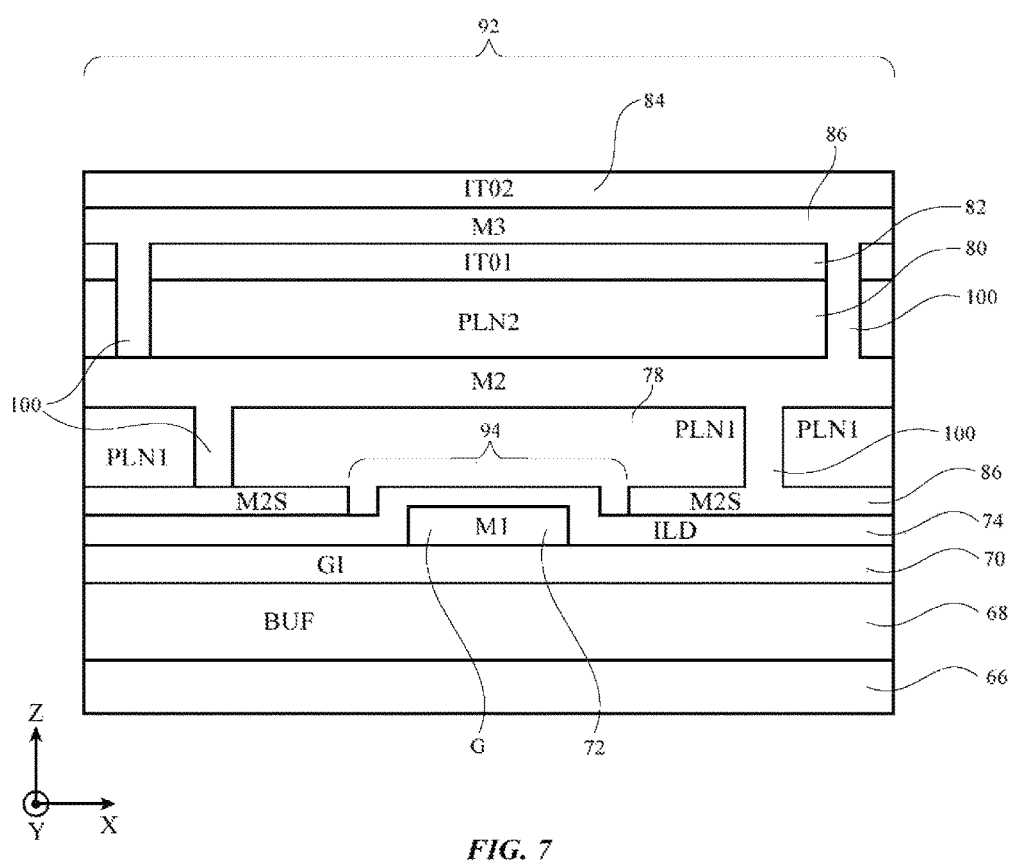
FIG. 7 is a cross-sectional side view of conductive layers in the thin-film circuitry forming a touch sensor signal border routing path with an opening that overlaps a gate line that is crossing the path in accordance with an embodiment.

FIG. 7 is a cross-sectional side view of a border routing path 92 that has been formed from multiple conductive layers in thin-film circuitry 14' on substrate 66. As shown in FIG. 7, vias 100 may be used in shorting conductive layers to each other. For example, vias 100 through planarization layer PLN2 may be used to short transparent conductive layer ITO1 to metal layer M2 and vias 100 through planarization layer PLN1 may be used to short metal layer M2 to metal layer M2S. Conductive layers may also be formed directly on top of each other and thereby shorted together. In the configuration of FIG. 7, for example, layer ITO2 has been formed directly on metal layer M3 and is therefore shorted to layer M3 and metal layer M3 has been formed directly on layer ITO1 and is therefore shorted to layer ITO1. Metal layer M1 forms a gate line G that runs perpendicular to path 92. Metal layer M2S of path 92 is separated from metal layer M1 by gate insulator 70. The other conductive layers of path 92 (M2, M3, ITO1, ITO2) are farther from metal layer M1 than metal layer M2S and therefore exhibit lower amounts of capacitive coupling. Accordingly, capacitive coupling between gate line G and path 92 can most effectively be lowered by at least removing metal layer M2S to form opening 94. If desired, metal layer M2 and/or other conductive layers may also be removed in opening 94. Although opening 94 increases resistance for the part of path 92 formed from metal layer M2S, the other conductive layers in path 92 are shorted in parallel with path M2S and can therefore carry signal current (i.e., drive signals DL) even when opening 94 is present.

Although sometimes described in the context of liquid crystal displays, openings 94 in metal layers such as metal layer M2S and/or the other conductive layers of touch sensor signal border routing paths 92 may be provided in other displays with integral touch sensor electrodes (i.e., touch sensor electrodes that carry both touch sensor signals and display pixel signals such as signal Vcom for pixels 32), if desired.

The foregoing is merely illustrative and various modifications can be made by those skilled in the art without departing from the scope and spirit of the described embodiments. The foregoing embodiments may be implemented individually or in any combination.

What is claimed is:

1. A display, comprising:
a substrate; and
thin-film circuitry on the substrate that forms an array of pixels and touch sensor circuitry, wherein the thin-film circuitry includes at least a first conductive layer that forms part of the pixels and that forms touch sensor electrodes for the touch sensor circuitry, a second conductive layer that forms gate lines coupled to the pixels, and a third conductive layer that forms part of a touch sensor signal border routing path, wherein the third conductive layer has openings that each overlap a respective one of the gate lines.

2. The display defined in claim 1 wherein the array of pixels has rows of pixels that extend along a horizontal dimension and columns of pixels that extend along a vertical dimension, wherein the touch sensor electrodes include horizontal electrodes that extend along the horizontal dimension, and wherein the touch sensor electrodes include vertical electrodes that extend along the vertical dimension.

3. The display defined in claim 2 further comprising gate driver circuitry, wherein the gate driver circuitry is coupled to the gate lines.

4. The display defined in claim 3 wherein the display has an active area in which the array of pixels is formed and has an inactive border area that is free of pixels and in which the touch sensor signal border routing path is formed.

5. The display defined in claim 4 wherein the signal border routing path includes multiple conductive layers including the third conductive layer.

6. The display defined in claim 5 wherein the third conductive layer comprises a metal layer.

7. The display defined in claim 6 wherein the multiple conductive layers include at least one indium tin oxide layer.

8. The display defined in claim 6 wherein the first conductive layer comprises an indium tin oxide layer and wherein the multiple conductive layers include at least the indium tin oxide layer and an additional indium tin oxide layer.

9. The display defined in claim 8 wherein the second conductive layer is a metal layer.

10. The display defined in claim 9 wherein the multiple conductive layers include at least two metal layers in addition to the third conductive layer.

11. The display defined in claim 10 wherein a given one of the at least two metal layers is interposed between the first conductive layer and the third conductive layer.

12. The display defined in claim 11 wherein the additional indium tin oxide layer has a portion that is shorted to a portion of the given one of the at least two metal layers.

13. The display defined in claim 12 wherein each pixel includes a thin-film transistor and wherein the portion of the given one of the at least two metal layers forms a source-drain terminal for the transistor.

14. The display defined in claim 13 wherein the openings are slot-shaped openings and wherein portions of the third conductive layer surround each of the slot-shaped openings.

15. The display defined in claim 13 wherein the openings are gaps that each separate a first portion of the third conductive layer in the touch sensor signal border routing path from a second portion of the third conductive layer in the touch sensor signal border routing path and that are not surrounded by portions of the third conductive layer.

16. A display, comprising:
a substrate;
thin-film circuitry on the substrate that forms an array of pixels and touch sensor circuitry;
display driver circuitry coupled to gate lines that are associated with rows of the pixels;
data lines that are associated with columns of the pixels;
horizontal touch sensor electrodes that run parallel to the gate lines;
vertical touch sensor electrodes that run parallel to the data lines;
touch sensor signal border routing paths each coupled to a respective one of the horizontal touch sensor electrodes; and
touch sensor circuitry that supplies signals to the horizontal touch sensor electrodes through the touch sensor signal border routing paths and that receives signals from the vertical touch sensor electrodes, wherein the touch sensor signal border routing paths are each formed from multiple conductive layers and wherein at least one of the multiple conductive layers has slot-shaped openings that run parallel to the gate lines.

17. The display defined in claim 16 wherein each slot-shaped opening overlaps a respective one of the gate lines.

18. The display defined in claim 17 wherein the multiple conductive layers include a common voltage electrode layer that is patterned to form the horizontal touch sensor electrodes and the vertical touch sensor electrodes and that supplies a voltage to a node in each of the pixels.

19. A display, comprising:
pixels;
gate lines that supply signals to the pixels;
capacitive touch sensor electrodes;
touch sensor circuitry;
touch sensor signal border routing paths that supply signals from the touch sensor circuitry to the capacitive touch sensor electrodes, wherein the touch sensor signal border routing paths include at least five conductive layers, wherein at least one of the five conductive layers has openings that run parallel to the gate lines, and wherein each opening overlaps a respective one of the gate lines; and
a transparent conductive layer that is patterned to form the capacitive touch sensor electrodes and that provides a voltage to each of the pixels.

* * * * *